US009047611B2

(12) United States Patent
Krishnamoorthy et al.

(10) Patent No.: US 9,047,611 B2
(45) Date of Patent: Jun. 2, 2015

(54) SYSTEM AND METHOD FOR FINDING RELATIVE SCORE AND ENHANCING ONE OR MORE SCORES ASSOCIATED WITH DATA OBJECTS

(75) Inventors: Prabhakaran Krishnamoorthy, Bangalore (IN); Uday Sankar Sen, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 536 days.

(21) Appl. No.: 12/693,248

(22) Filed: Jan. 25, 2010

(65) Prior Publication Data

US 2011/0184958 A1 Jul. 28, 2011

(51) Int. Cl.
*G06F 15/18* (2006.01)
*G06Q 30/02* (2012.01)

(52) U.S. Cl.
CPC ...................................... *G06Q 30/02* (2013.01)

(58) Field of Classification Search
USPC ............................ 706/12, 45, 62; 705/5, 7.14
See application file for complete search history.

(56) References Cited

U.S. PATENT DOCUMENTS 7,725,405 B2 * 5/2010 Johnson ........................ 705/321
8,713,000 B1 * 4/2014 Elman et al. .................. 707/722
2002/0055866 A1 * 5/2002 Dewar .............................. 705/8
2003/0200136 A1 * 10/2003 Dewar ............................ 705/11
2009/0164282 A1 * 6/2009 Goldberg .......................... 705/7
2010/0042574 A1 * 2/2010 Dewar ............................ 706/54
2010/0070448 A1 * 3/2010 Omoigui ......................... 706/47
2010/0077327 A1 * 3/2010 Pulsipher et al. ............. 715/764
2010/0211516 A1 * 8/2010 Andrekovich et al. ....... 705/321
2010/0293126 A1 * 11/2010 Lang et al. ....................... 706/46
2011/0282913 A1 * 11/2011 Kitamura et al. ............. 707/794

OTHER PUBLICATIONS

Bojārs, U., & Breslin, J. G., ResumeRDF: Expressing skill information on the Semantic Web, 2007, in 1 st International ExpertFinder Workshop, pp. 1-5.*

(Continued)

*Primary Examiner* — David Vincent
(74) *Attorney, Agent, or Firm* — James J. DeCarlo; Greenberg Traurig, LLP

(57) ABSTRACT

Methods, systems and computer program products are provided for computing relative score and enhancing one or more scores associated with data objects. In one method, the method receives, at a computing system, one or more data objects from a user. The method further extracts one or more internal and external parameters based on the one or more data objects. Subsequently, the method compares data objects of the user with corresponding data objects of one or more competing users, based at least in part on the one or more extracted parameters and the requirement included in the data object of the user. Further, in some embodiments, the data objects and requirements of the user are also compared with the corresponding data objects and requirements of one or more complementary users, based at least in part on the one or more extracted parameters. The method further computes one or more scores associated with the data objects based at least in part on the at least one of the comparison of the one or more data objects of the user with the corresponding data objects of one or more competing users and/or the one or more extracted parameters. The method may also provide feedback to the user, where the feedback is directed to enhance the one or more computed scores associated with the data objects.

19 Claims, 8 Drawing Sheets

| | |
|---|---|
| *INTERNAL PARAMETERS* | |
| Requirement | IT engineering, senior position |
| Restrictions | ABX Corporation, Above $100,000 per annum, California, Full time |
| Past Experience | JMT Coompany of America, 5 years |
| Education | A&M University, masters degree, computer engineering |
| Gap Year | Present |
| Current Job Status | Senior programming expert, JTM Company of America |
| Self rating | Above Average |
| *EXTERNAL PARAMETERS* | |
| Current economic conditions | |
| IT sector market analysis | |
| Lay offs in IT sector | |
| Mass hiring companies | |
| Competition faced | |
| Season of job application | |
| Demand-supply ratio | |
| Direction of movement of related organization | |
| Rarity of skill set | |
| *HISTORICAL PARAMETERS* | |
| Company name | JMT Company of America |
| Duration | 5 years |
| *RECOMMENDATIONS* | |
| Recommender | Mr. J Smith |
| | Director, JMT Company of America |

302

(56) References Cited

OTHER PUBLICATIONS

Kargioti, E., Kontopoulos, E., & Bassiliades, N., OntoLife: an Ontology for Semantically Managing Personal Information, 2009, In Artificial Intelligence Applications and Innovations III (pp. 127-133). Springer US.*

Aleman et al., Combining RDF Vocabularies for Expert Finding, 2007, NRC Publications Archive Archives des publications du CNRC pp. 1-17.*

Bizer, C., In Wirtschaftsinformatik 2005, Physica-Verlag HD, pp. 1367-1381.*

Aleman-Meza, Combining RDF vocabularies for expert finding, 2007, Springer-Verlag, pp. 235-250.*

* cited by examiner

*Personal Details*
Name: XYZ
Age: 30 years

*Contact Details*
Address: 9, Bella Vista Apt., 66th street, CA 96140.
Email: xyz@yahoo.com

*Expected Position*
Senior IT programming engineer

*Preferences*
Preferred company: ABX Corporation
Salary: Above $100,000 per annum
Location: California
Mode: Full time

*Educational Qualifications*
From Sept. 2000 to Apr. 2003, I got master degree from Texas A&M University in computer software engineering.
From Sept. 1996 to July 2000, I got bachelor degree from School of ABC and major in Computer Science and Technology.

*Skill set*
Languages known: C, C++, Java, C#, PERL
Operating system: Linux, Unix, Windows
Platforms: .NET
Web Designing: XML, Ajax, RSS
Databases: Oracle

*Additional Professional Courses*
Course on Computer Networking in June 2005 from CIFL Institute, New York.
Course on Advance Database Management in December 2007 fro TJ Institute, New Jersey.

*Work Experience*
Currently working as a Senior Programming Expert since the last 5 years at JMT Company of America
I have handled a wide variety of projects, such as Applications and System design related to Human Face Recognition, Virtual Reality and Augmented Reality Gaming

*Recommendations*
Mr. J Smith
Director, JMT Company of America

*Self Rating*
Above Average

| *INTERNAL PARAMETERS* | |
|---|---|
| Requirement | IT engineering, senior position |
| Restrictions | ABX Corporation, Above $100,000 per annum, California, Full time |
| Past Experience | JMT Coompany of America, 5 years |
| Education | A&M University, masters degree, computer engineering |
| Gap Year | Present |
| Current Job Status | Senior programming expert, JTM Company of America |
| Self rating | Above Average |
| *EXTERNAL PARAMETERS* | |
| Current economic conditions | |
| IT sector market analysis | |
| Lay offs in IT sector | |
| Mass hiring companies | |
| Competition faced | |
| Season of job application | |
| Demand-supply ratio | |
| Direction of movement of related organization | |
| Rarity of skill set | |
| *HISTORICAL PARAMETERS* | |
| Company name | JMT Company of America |
| Duration | 5 years |
| *RECOMMENDATIONS* | |
| Recommender | Mr. J Smith |
| | Director, JMT Company of America |

| | |
|---|---|
| *INTERNAL PARAMETERS FUNCTION POINTS* | |
| Total weightage : 60% | |
| Function point | Value |
| Skill set | 15 |
| Past Experience | 6 |
| Expected Position | 11 |
| Expected Salary | 10 |
| Total | 42 |
| *EXTERNAL PARAMETERS FUNCTION POINTS* | |
| Total weightage : 25% | |
| Function point | Value |
| Season of application | 12 |
| Rarity of skill set | 6 |
| Total | 18 |
| *HISTORICAL PARAMETERS FUNCTION POINTS* | |
| Total weightage : 5% | |
| Function point | Value |
| Trend | 3 |
| Total | 3 |
| *RECOMMENDATIONS FUNCTION POINTS* | |
| Total weightage : 10% | |
| Function point | Value |
| Past employer | 7 |
| Total | 7 |
| | |
| Relative score | 42+18+3+7 = 70 |
| Absolute score | 82 |
| Gross score | 76 |

Welcome! XYZ

As per the data submitted by you, we are pleased to inform you of your results as follows:

Relative Score (indicative of your standing as compared to others) is 70
Absolute score (indicative of your success chances) is 82
Gross score (overall rating) is 76

Your strengths:
1. Complexity of past projects
2. Recommendations

Your weaknesses:
1. Gaps present in education

Suggestion:
Professional course in Computer Networking offered by ABC institute, Texas.

Amendments suggested:
On shifting to Los Angeles, prospects increase by 5%

Predicted date of achievement: 2 months

[ Ignore ]     [ Change profile ]

— 304

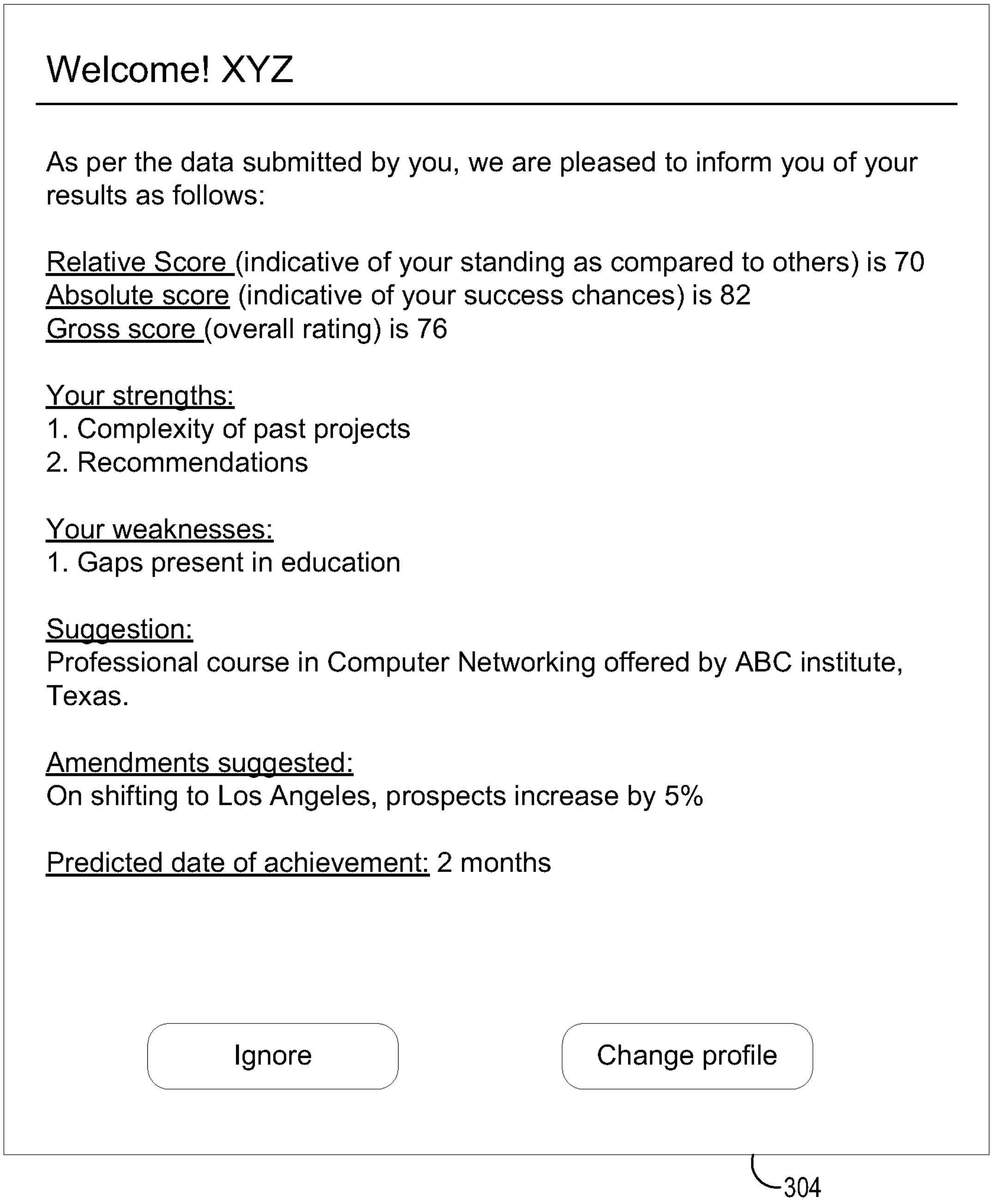

*FIG. 3D*

SYSTEM AND METHOD FOR FINDING RELATIVE SCORE AND ENHANCING ONE OR MORE SCORES ASSOCIATED WITH DATA OBJECTS

TECHNICAL FIELD

The present disclosure generally relates to system and methods for enhancing one or more scores associated with data objects submitted by a user.

BACKGROUND

The advent of the Internet has proved to be a boon to address one or more requirements of a user. Internet provides easy and fast access to meet the needs of a host of requirements that the user may have, like that of a booking air tickets and making hotel reservations to a travel destination, buying or selling any consumer product, searching for a suitable life partner, looking for employment, and the like. The user (such as a job seeker) may submit his requirements or attributes by means of one or more data objects that may include his/her requirements pertaining to acquiring a particular service, job and/or desired product. On the other end, a complementary user who provides or offers the services, jobs and/or products to match the one or more requirements of user also submits his requirements in the form of one or more data objects to an intermediate platform.

Known systems may match the requirements of the user with that of the complimentary users either manually or by means of machine learning algorithms. Further, these systems may also allow the user to analyze and select the submitted complementary user's data object that suitably satisfies the user's requirements.

However, if the user's requirements do not match or appropriately correlate to the requirements of the complementary user that is offering the corresponding job, service, and/or product, the user is simply rejected on those grounds. The user may not be informed about the basis of the rejection. Further, in the case of other users who may be competing for the same requirement, the user may not be informed about the cause of the competing users' selection and/or rejection. Thus, the user may lack the information about the various factors that he/she may modify in order to enhance the chances of achieving his or her goals.

SUMMARY

In particular embodiments, the present invention provides methods, systems and computer program products for enhancing one or more scores associated with data objects of a user. In one method, the method receives, at a computing system, one or more data objects from a user. The data object includes one or more requirements of the user. The method further extracts one or more internal and external parameters based on the one or more data objects. Subsequently, the method compares data objects of the user with corresponding data objects of one or more competing users, based at least in part on the one or more extracted parameters and the requirement included in the data object of the user. Further, in some embodiments, the data objects and requirements of the user are also compared with the corresponding data objects and requirements of one or more complementary users, based at least in part on the one or more extracted parameters. The method further computes one or more scores associated with the data objects based at least in part on the at least one of the comparison of the one or more data objects of the user with the corresponding data objects of one or more competing users and/or the one or more extracted parameters. The one or more scores may provide an indication of a likelihood of achieving the requirement included in the data object of the user. The method may also provide feedback to the user, where the feedback is directed to enhance the one or more computed scores associated with the data objects. In various embodiments, the method may further receive the modified data objects based on the feedback provided by the method and subsequently the method may re-compute the one or more scores associated with the data objects.

BRIEF DESCRIPTION OF THE DRAWINGS

FIG. 3A is an example data object submitted by a user, in an example embodiment of the present invention;

FIG. 3B illustrates a table that depicts one or more extracted parameters associated with the data object, in an example embodiment of the present invention;

FIG. 3C illustrates a table that depicts the score computation for the data object, in an example embodiment of the present invention;

FIG. 3D illustrates a table that depicts a feedback given to the user to enhance one or more computed scores associated with the data object, in an example embodiment of the present invention;

DETAILED DESCRIPTION

Example Network Environment

Figure 1:
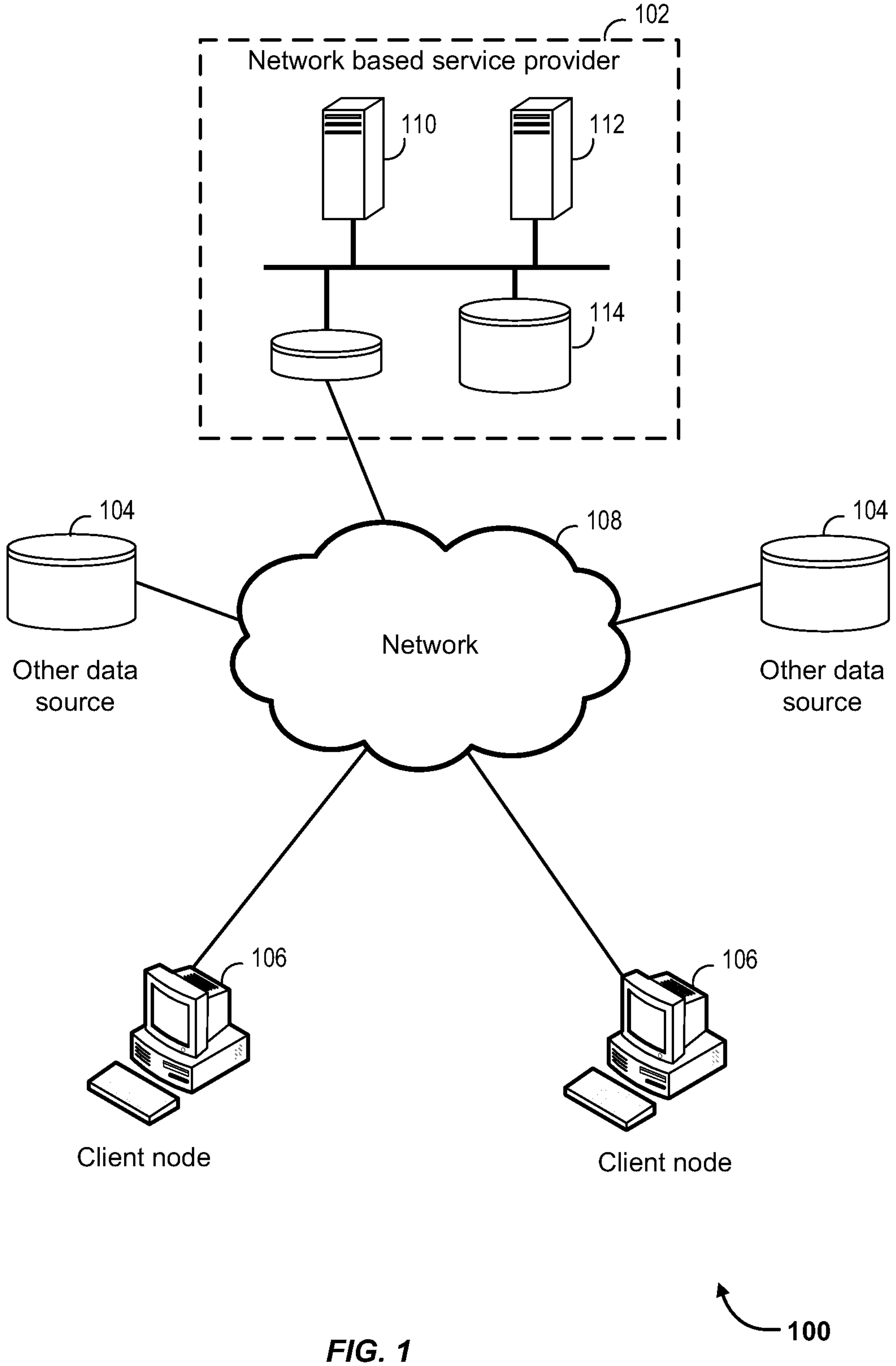
FIG. 1 illustrates an example of network environment in which particular implementations of the invention may operate.

FIG. 1 illustrates a network environment 100 in which particular implementations of the invention may be deployed, according to one embodiment. Network environment 100 includes network-based service provider 102, one or more other data sources 104, one or more client nodes 106 and a network 108. Network-based service provider 102 includes an application server 110, an enhancing module 112, and a user information database 114. Network 108 generally represents one or more interconnected networks, over which network-based service provider 102, other data sources 104, and client nodes 106 can communicate with each other. Network 108 may include packet-based wide area networks (such as the Internet), local area networks (LAN), private networks, wireless networks, satellite networks, cellular networks, paging networks, and the like. A person skilled in the art will recognize that network 108 may also be a combination of more than one type of network 108. For example, network 108 may be a combination of a LAN and the Internet. In addition, network 108 may be implemented as a wired network, or a wireless network or a combination thereof. Client nodes 106 are communicatively coupled to network 108 via network-based service provider 102 or any other suitable methods known in the art.

Client Nodes

Client nodes 106 are computing devices from which a user accesses the services provided by network-based service provider 102. In one embodiment, the user accessing client nodes 106 may be an individual or an organization. Client nodes 106 have the capability to communicate over network 108. Client nodes 106 further have the capability to provide the user an interface to interact with the services provided by network-based service provider 102. Client nodes 106 may be, for example, a desktop computer, a laptop computer, a mobile phone, a personal digital assistant, and the like. Client nodes 106 may execute one or more client applications such as, without limitation, a web browser to access and view content over a computer network, an email client to send and retrieve emails, an instant messaging client for communicating with other users, and a File Transfer Protocol (FTP) client for file transfer. Client nodes 106, in various embodiments, may include a Wireless Application Protocol (WAP) browser or other wireless or mobile device protocol suites such as, without limitation, NTT DoCoMo's i-mode wireless network service protocol suites, EDGE, and the like.

Network-based Service Provider

Network-based service provider 102 is a network addressable system that provides a means to the user to address his requirements that are related to one or more services and/or products. The one or more services and/or products are accessible over network 108 to the user via client nodes 106. The user may submit his requirements by the means of one or more data objects. The data objects may be one of portable document file, word file, text file, excel file, an online form, an XML file (or other structured document), or a scanned image. Further, the data objects may include one or more requirements and/or information associated with the user. In one embodiment, the user may be required to have an account with network-based service provider 102 in order to submit the data objects. Application server 110 may be responsible for creation and handling of the user account. Application server 110 may include a registration and authentication server (not shown in FIG. 1) which facilitates the registration of new users, and authenticates existing users at sign-in. Further, the registration and authentication server may use security protocols such as Secure Sockets Layer (SSL), Transport Layer Security (TLS) or GnuTLS.

On registration, application server 110 may ensure that the user account details are stored in user information database 114. For example, if the user has the requirement of availing of a holiday package to a desired destination, the user may first create an account maintained by network-based service provider 102 and then may lookup the various packages available through the one or more holiday package service provides.

Subsequent to registration, application server 110 may be responsible for invoking enhancing module 112. Enhancing module 112 may receive the data objects from application server 110. The data objects may include information associated with one or more requirements of the user and may further include, but not be limited to, attributes and/or criteria associated with the user. Enhancing module 112 may extract one or more parameters based on the information contained in the data objects. Subsequently, enhancing module 112 may compare the information and/or requirements included in one or more data objects of the user with that of competing users. The competing users are selected based at least in part on the similarity of requirements included in the data objects of the user and the data objects of the one or more competing users. In one embodiment, enhancing module 112 may compute one or more scores based at least in part on the computed score and the extracted parameters. In an embodiment, the one or more scores include, but are not limited to, an absolute score and a relative score associated with the data objects. In one embodiment, the relative score may be based on the extracted parameters and the comparison data. Similarly, the absolute score may be based on the availability of the services and/or products corresponding to the requirements of the user, as extracted from the one or more data objects, received from the user. The score may represent a standing or listing to the user which represents a chance the user may have to attain his requirements through network-based service provider 102. Moreover, in one embodiment, enhancing module 112 may provide feedback to the user to change one or more parameters to enhance his score and thus the stand to attain his/her requirements.

Other Data Sources

Enhancing module 112 may also obtain additional information from other data sources 104. Other data sources 104 are publicly available sources, or online services, which may store additional information. The additional information may include, without limitation, historical parameters, social parameters, political parameters, socio-political parameters, environmental parameters, locational parameters, economic parameters, skill parameters or any other general, comparative or statistical information such as climatic conditions, consumer demands, and the like that may be directly or indirectly associated with the information contained in the data objects. The additional information may also include, information associated with various organizations and industries, stocks, economy conditions and the like. Example publicly available other data sources 104 include, without limitation, United States Bureau of Labor Statistics, and PayScale Inc. for obtaining statistical data of wages, employee benefits, and employment costs in different geographic regions, different industries and different positions in an industry; educational institution rankings such as those provided by U.S. News and World Report; and top employer rankings such as those provided by Fortune magazine and Forbes magazine. Example online services include social networking websites such as LinkedIn®, for obtaining references, special skills, and career objectives of the user (using the user's profile information); and online finance websites such as Yahoo! Finance® for obtaining insights on the user's interest in his future professional career and academic pursuits (using page viewing statistics). Further, other data sources 104 may include government websites, meteorological websites, or other information repositories that store publicly available data and may have an impact on the economic, environmental, geographical or political conditions.

Although FIG. 1 illustrates the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein. In addition, other implementations may operate in network environments where one or more of the systems described herein have been omitted.

Enhancing Module

Figure 2:
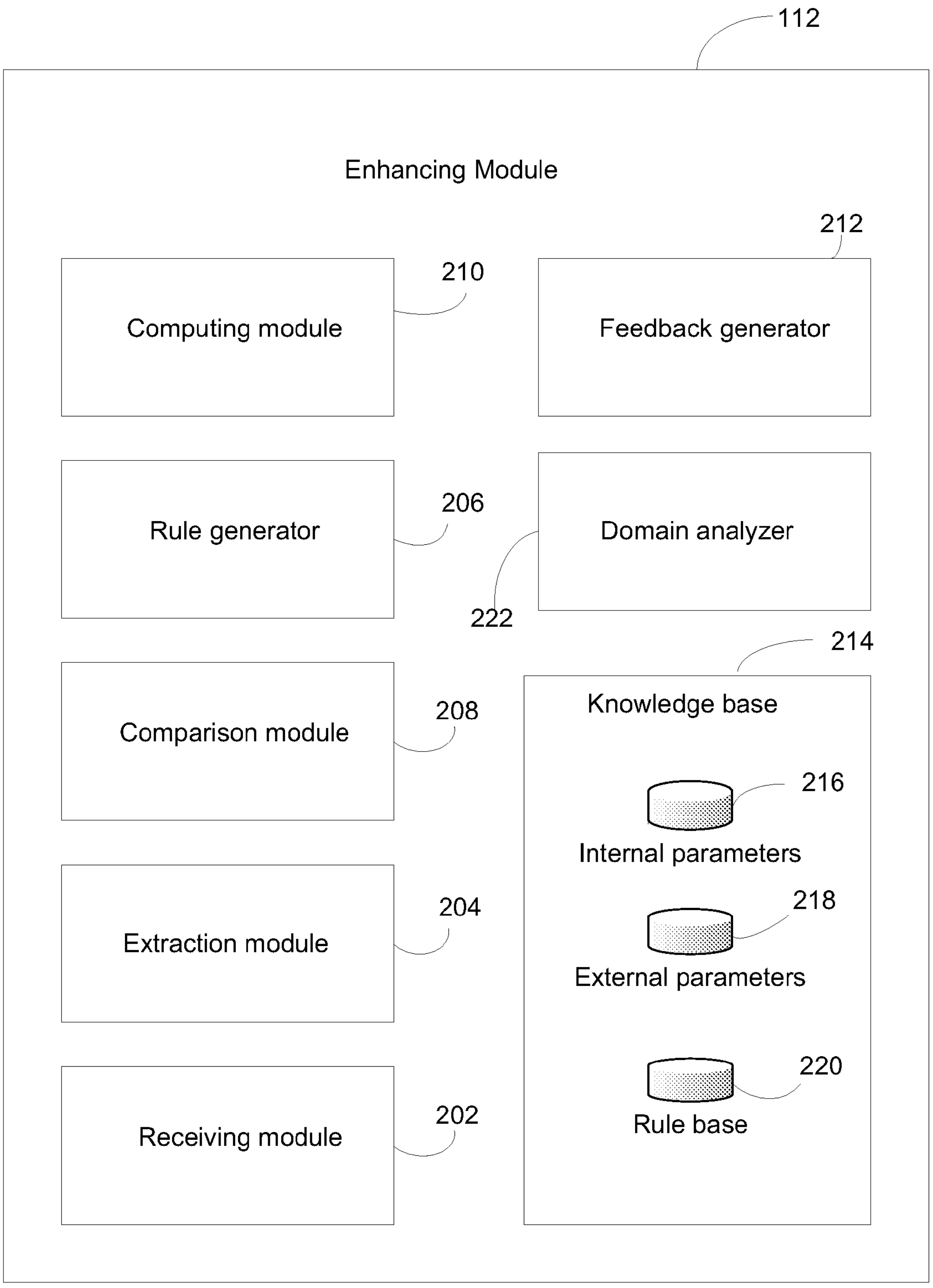
FIG. 2 is a block diagram of enhancing module in an example embodiment of the present invention.

FIG. 2 is a simplified block diagram of enhancing module 112 in accordance with one embodiment. As shown in the FIG. 2, enhancing module 112 may include a receiving module 202, an extraction module 204, a rule generator 206, a comparison module 208, a computing module 210, a feedback generator 212 and a knowledge base 214. Receiving module 202 may receive the one or more data objects from application server 110. The user may have submitted the data objects with application server 110, by means of one or more web applications provided by application server 110. In one embodiment, the user may be an individual, a corporation, organization or any other entity. Further, the data objects may include one or more requirements. For example, in case of the user being an individual, the requirements of the user may include, but not limited to, to acquire a suitable job position, to buy a consumer product, to buy/sell services and/or products in an online environment and the like. Additionally, in case of the user being an organization, the requirements of the user may include, but not limited to, to acquire a suitable employee as per a vacant job position, provide suitable holiday packages to tourists, sell available products or services to customers, and the like. Hence, the requirements submitted by the user may differ as per the needs and selection criteria of the user. Moreover, the data objects may also include one or more informational attributes associated with the user, such as, but not limited to, social contacts, qualifications, business motive, products information, contact details and the like.

In one embodiment, the data objects may include the requirements of the user to avail of services and/or products. Further, the user may also include one or more conditions, restrictions and/or criteria that the user may impose in order to meet his requirements. For example, if the user intends to go on a holiday to a particular destination and wants to make online hotel reservations for the same, the user requirements may be to reserve an available room that meets certain criteria like booking of a room that has a sea-facing view, certain cost considerations or certain other conditions such as the hotel location and the like.

In one embodiment, the user may upload the data objects through an application provided by network-based service provider 102. The data objects may be, without limitation, a word processor document, a Portable Document Format (PDF) file, a text file, a Hyper-Text Markup Language (HTML) file, a Tagged Image File Format (TIFF) image or a Portable Network Graphics (PNG) image. Further, the data objects may be, without limitation, an electronic version of the user's resume, the user's job hiring requirements, the user's desired holiday destinations, the user's personal details for online dating sites, the products and/or services the user desires to purchase or sell, and the like.

In one embodiment, the structure in which the information is contained in the data objects does not adhere to any common format. Moreover, the information contained in the data objects submitted as one or more digital files pertains to the requirements of the user in order to avail of certain services as per the user's need. For example, the user may upload his user profile on an online dating site, stating all his family details, health details, professional details and virtues in order to find a suitable spouse. The information of these data objects may be in any order or format that need not essentially be standardized for all such user profiles.

However, for analyzing the information and/or requirements associated with the user to that of one or more competing users and/or complementary users, the competing users' requirements are of the same nature as that of the user being considered, while the requirements of the complementary users may be complimental to that of the user. Thus, the unstructured format of the information contained in the data objects is required to be converted to a structured format, to retrieve the information and or requirements included in the data objects.

In an embodiment, extraction module 204 extracts the information included in the data objects. In one embodiment, extraction module 204 may employ an electronically executed method, such as, but not limited to, a machine learning algorithm, fuzzy algorithm, neural networks, supervised learning, unsupervised learning, and the like; for converting the unstructured format of the data objects to a structured format and thus extract the information from the data objects. For example, user's information in a resume may contain applicant experience and education in a chronological order, or reverse chronological order. Additionally, the extraction may also be done manually. Machine learning is a scientific discipline concerned with the design and development of algorithms that allow computers to learn based on data, such as from sensor data or databases.

In another embodiment, the user may provide the information in a web form hosted on application server 110. The information provided in the web-form may follow a common format. The format of this web-form may vary depending on the requirements of the user. Since, the information is in a structured format, extraction module 204 does not necessarily employ the machine learning algorithm.

In an embodiment, extraction module 204 may extract one or more internal parameters based on the information included in the data objects. In one embodiment, extraction module 204 may employ a suitable machine learning algorithm to extract the internal parameters. In another embodiment, the internal parameters can be extracted manually. The internal parameters are those parameters that are essential to the data object and are derived from the data objects submitted by the user. The internal parameters may be considered as strong points, attributes or assets of the data object that are essential to describe the requirements of the user. Further, internal parameters are those features that can be used to distinguish the information contained in the data object of the user from that of data objects that belong to the same domain but are submitted by the competing users. The internal parameters may either have a positive or negative impact on the requirements of the user stated his data object. For example, in case of the user being an applicant for a job, the user may submit the data object as his/her resume. In this situation, the internal parameters may include, but not limited to, educational qualification, current job status, past job experience, salary requirement, location preferences, travel willingness or willingness to change location, expected position, reputation of the previous employer and the like. In an embodiment, the positive impact of the internal parameters may be considered if the user has worked with a reputed organization, or is willing to change location, has worked on a combination of technologies and his acquired skills through education and previous job experience is in demand. Further, various paper presentations, awards, or association with recognized councils may also be considered as positive impact. The various internal parameters pertaining to the application for a job are explained in conjunction with FIG. 3. In one embodiment, the user may submit a new attribute and/or parameter manually and extraction module 204 may use the new added attribute and/or parameter to compute one or more scores associated with the data objects of the user.

In one embodiment, the internal parameters may be updated or refined in a pre-defined period of time. The internal parameters are stored in an internal parameter database 216 of knowledge base 214. Knowledge base 214 may further include an external parameter database 218 and rule base database 220. Enhancing module 112 includes a domain analyzer 222 that suitably identifies the domains and sub-domains to which the data objects pertain. Rule generator 206 is used to convert the one or more extracted parameters into suitable rules such that the rules are stored in rule base database 220. Knowledge base 214 may be implemented using any known database solution such as a Relational Database Management System (RDBMS), an Extensible Markup Language (XML) database, a flat file database, and the like.

In one embodiment, extraction module 204 may also extract one or more external parameters based on the information contained in the data object. The external parameters include all those parameters that may directly or indirectly have an impact on the data objects submitted by the user. The external parameters may include, but are not limited to, social parameters, political parameters, socio-political parameters, environmental parameters, locational parameters, economic parameters, statistical comparative parameters, skill parameters, and the like that are relevant to the domain to which the data objects belongs. Further, these external parameters may either enhance or hamper the chances of the requirements of the user being met. In an embodiment, extraction module 204 may extract the external parameters from one or more other data sources 104 like the internet, publicly available data stores, etc. For example, if the user intends to book online tickets for a movie, the rating given to the movie, extracted from public databases like the Internet Movie Database© contribute to the external parameters that impact the user's needs of buying a movie ticket of a movie which has performed well at the box-office. The external parameters are derived from the knowledge domains and sub domains identified by domain analyzer 222.

In one embodiment, domain analyzer 222 may identify one or more knowledge domains and/or sub domains that the data objects may belong to. The knowledge domains are identified based on the internal parameters of the data objects, extracted by extraction module 204. The identified knowledge domains may be used to accordingly judge the relevant other data sources 104 that are pertinent to the given data objects. For example, if the user intends to purchase a consumer product, all the entities that offer that consumer product for sale as well as all other users in search of the same consumer product may belong to the same knowledge domain.

Domain analyzer 222 makes use of an electronically executed method to suitably distinguish between the relevant knowledge domains and/or sub domains to those that are irrelevant for the given object. In one embodiment, domain analyzer 222 may also make use of any other method such as machine learning algorithms, fuzzy algorithms, neural networks, and the like. These knowledge domains may include one or more domains and/or sub domains that are distinct or may overlap in terms of one or more parameters. Further, domain analyzer 222 is used, but is not limited, to group the data objects into suitable classes depending on the domains that they belong to. This classification of the data objects into relevant classes is performed by the machine learning algorithm and facilitates in identifying one or more data objects that are related to each other. Thus, the user's data object and the one or more competing users' data objects may be grouped together under the same class based on the similarity of requirements contained in the data objects. This allows the comparison of data objects that are submitted for the same purpose by a plurality of users. Further, both the user's data object and the complementary user's requirement may be categorized under the same class, thereby allowing two or more distinctly comparable data objects to be grouped together. Thus, the data objects that belong to the same class include data objects that have complementary requirements as well as data objects that have the same requirements. For example, the data object of user who uploads his resume will be grouped in the same class as the organization's data object that states the employer's requirements; as well with the data objects of other users competing for the same job position. Domain analyzer 222 may invoke extraction module 204 to extract the external parameters from other data sources 104 based on the knowledge domains identified. For example, if the user intends to visit a particular tourist location, the user profile and the hotels offering accommodation located near the desired tourist location belong to the same class. The discount offered to the user based on his previous lodging at the same hotel and the current season of travel serve as external parameters to be considered while making the room reservations.

Further, the external parameters also include the statistical comparative analysis of the requirements of other data objects submitted by competing users that pertain to the same domain and/or sub domain of the user. This comparative analysis data may be gathered over time. This extracted comparative analysis data may be used to compare the user's data object with that of one or more competing user data objects.

In one example embodiment, when the user submits one or more data objects to apply for a job, the external parameters may include, but are not limited to, economic factors, socio-political conditions, job conditions in the market, natural or environmental factors, locational advantages, seasonal impact on hiring, competition and the like. The various external parameters pertaining to the application for a job are explained in conjunction with FIG. 3

Additionally, in an embodiment of the present invention, the historical information pertaining to the same domain as the data objects may also be considered a parameter for the calculation of the one or more scores associated with the data object. In various embodiments of the present invention, this information may be optional. The historical information generally pertains to, but is not limited to, statistically analyzed data that dictates a trend in a particular activity, market or competitive analysis, or past data analysis. Historical information is suitably extracted and stored in external parameter database 218. For example, for online auctions the past records of the products auctioned and their respective rates, including the buying trends of certain frequent purchasers serve as historical information.

In an embodiment, inputs and/or recommendations provided by the user himself and/or other users may also be considered in the calculation of the one or more scores associated with the data object. In an example embodiment, the user may provide some additional inputs other than the data objects to improve the definition of the data objects. Moreover, the social contacts of the users may also provide recommendation and/or inputs about the user and/or complementary users who may fulfill the requirements of the user. This input and/or recommendations provided are optional and may be subject to user constraints. Further, the input and/or recommendations are stored in external parameter database 218. For example, in case of a job scenario, the recommendation of a previous employer for the user, previous placement history of the user, user's self rating, and user's input about the complementary user (organization) strength or weakness may also be considered as parameters for the score computation.

In one embodiment, rule generator 206 may convert the extracted internal and external parameters into one or more rules to make suitable inferences on the extracted information through these parameters.

Rule generator 206 is used to generate one or more rules that arise from the dependencies that exist in the parameters that affect the data objects. These one or more dependencies may exist between one or more internal parameters, external parameters, and further optionally between historical parameters and/or recommendations, or any combination thereof. The parameters affecting the data objects are suitably retrieved from the internal parameter database 216 and external parameter database 218 of the knowledge base. Additionally, the inter-relationship or dependencies may be formed relating to the parameters that pertain to a single data object or a collection of one or more data objects that belong to the same class identified by domain analyzer 222. In one embodiment, an electronically executed method may be used to derive these sets of rules, by taking into consideration the relationships that may arise, both directly and indirectly, from the parameters that may affect the data object or group of data objects that pertain to the same class or both. These rules may be generated by the mapping of the extracted parameters, which includes internal and external parameters, and inferred dependencies that are stored in rule base database 220 of knowledge base 214.

In one embodiment, the rules may be generated manually by a system administrator and stored in rule base database 220.

In one embodiment, comparison module 208 may compare the one or more data objects of the user with that of the competing users for the same requirements. In one embodiment, the data objects are compared based on the information extracted from one or more internal and external parameters. The comparison of these data objects may take place, but not limited to, by comparing the one or more data objects that belong to the same domain and/or sub domain identified by domain analyzer 222.

In one embodiment, computing module 210 may compute the one or more scores based at least on one of the comparison data received from comparison module 208 and/or from the information extracted from the one or more internal parameters, external parameters, optionally including historical parameters and/or recommendations. Computing module 210 may retrieve the rules generated and stored in rule base database 220 to compute an absolute score and a relative score. Further, the extracted parameters may be retrieved from the internal parameter database 216, external parameter database 218, or any combination thereof.

In one embodiment, the relative score associated with the data objects is calculated based on the internal parameters, external parameters, and the comparison data received from comparison module 208. Thus, the relative score of data objects may provide the standing of the data objects submitted by the user to that of other data objects submitted by competing users that belong to the same class as that of the user's data object. The relative score may thus be used to compare the user's data object with that of competing user's data objects. Thus, relative score associated with the user's data object is indicative of the likelihood of achieving the requirement included in the data object of the user. For example, if the user's data object has a score of 75, while that of his competitor is 80, then the user has lesser chances of fulfilling his requirement as compared to his competitor.

In one embodiment, the absolute score may be the measure of the degree by which two comparable data objects, namely the user requirement with the available service and/or product corresponding to the user requirement, are similar. The absolute score is calculated based at least in part on a comparison between the requirements included in the data objects of the user and the complimental requirements included in the data objects of the complimentary users. Moreover, in one embodiment, absolute score may be calculated based on, but not limited to, the extracted parameters that may belong to a group of one or more data objects that may belong to the same class. Hence, the absolute score of the data object may provide the measure of how closely the user's requirements may be matched to the corresponding complementary requirements of another user (who provide the service and/or product to match the user requirement). In other words, the absolute score provides an indication of a likelihood of how the user fares against the complimentary requirements.

In one embodiment, the one or more scores associated with the data object may have a numerical value or may be expressed as a percentage. Further, the scores may also be expressed as a percentile. Additionally, the scores may lie within a pre-defined range such that the user's scores associated with the data object may be accordingly categorized as a good score, average score or poor score. Further, the user may also be notified about his rank that is suggested by how high his scores are as compared to that of other users. For example, for a score range of 300 points to 900 points, a user's data object having a score of 850 points is considered to be a good score.

In one embodiment, computing module 210 may determine the function points and suitably assign weighting to the extracted parameters that include but is not limited to, the external parameters, internal parameters, optionally including historical parameters and/or recommendations, or any combination thereof. These function points are those extracted parameters, that include internal parameters, external parameters, historical parameters, recommendations, or combination thereof, that may be required in computing the one or more scores assigned to the data objects. In one embodiment, the function points may be determined by the user. In another embodiment, computing module 210 automatically determines the function points. In one embodiment, computing module 210 may employ an electronically executed method and/or manually identify the function points that may impact the computation of the one or more scores. The weighting of the extracted parameters may determine the amount of weight or influence given to the extracted parameters. In one embodiment, the weighting may differ for the contribution of the same extracted parameters in the calculation of the absolute score and the relative score. Additionally the weighting may be given in terms of an absolute value, residing within a pre-defined range, or by a percentage value. Thus, the computing module 210 may assign a value to the internal parameters, external parameters, historical parameters, recommendations, or all, that belong to an individual data object or a group of data objects.

Additionally, the values may be numerical values, lying within a predefined range or a percentage or a percentile value. The one or more scores are calculated dynamically and may change under certain conditions. These conditions include change in the external parameters due to reasons outside the user's scope, change in the weighting given to the parameters, change in the internal parameters within the user's scope, which may arise due to the feedback given by feedback generator 212 in order to improve the one or more scores computed, change in the recommendation provided by other users, etc. For example, in the case of job hiring, the employee may decide on designating a weight of 60 for the internal parameters and 40 for the external parameters. Further, the weight may also be provided to the historical factors and one or more inputs/recommendations provided by other users.

In one embodiment, computing module 210 may calculate a gross score which may be the summation of the average of the absolute score and the relative score.

In one embodiment, feedback generator 212 may analyze the one or more scores computed by computing module 210 and provide a listing of the internal parameters, external parameters, optionally including historical parameters, recommendations, or all, that need to be modified, improved, added or removed, in order to improve the one or more scores associated with the data object. For example, in the case when the user desires to secure a particular job position, the feedback generator may inform the user that on acquiring a particular skill set, the user may improve the chance of acquiring his desired post.

Feedback generator 212 may access the one or more scores computed by computing module 210 to suitably analyze the impact of the various parameters on the scores associated with the data object. Further, feedback generator 212 may access internal parameter database 216, external parameter database 218 and rule base database 220 to determine how the scores may be improved by analyzing the dependencies that exist amongst one or more internal parameters, external parameters, optionally including historical parameters, recommendations, or any combination thereof. An electronically executed method such as, but not limited to, a machine learning algorithm, fuzzy algorithms, neural networks, supervised learning, unsupervised learning, and the like; may be used to analyze these inter-relationships amongst parameters pertaining to the same data object, or the dependencies that arise due to the comparison between two or more distinct data objects that belong to the same class.

Further, feedback generator 212 also considers the weighting assigned to the various parameters, in order to determine the changes that need to be made to one or more parameters to improve the user's chances of fulfilling his requirement as compared to that of other users that have the same requirement. Improvement of the relative score may allow the user to increase his overall user profile standing by increasing the chances of the user of fulfilling his requirement as compared to that of the competing users. For example, the user may be informed that on completing a particular course of study, his relative score may increase from 75 to 82, thereby increasing his chances of acquiring a suitable job, as compared to that of the competing user's data object which may have a relative score of 80.

Additionally, enhancing the absolute score computed for the data objects provides a means to the user to increase his likelihood of matching his requirements to the corresponding requirements of the complementary user. Feedback generator 212 may provide an option to change on or more parameters included in the data object of the user to enhance the absolute score and thus the likelihood of user fairing against the requirements included in the data object of the complimentary users. For example, improving the absolute score of the user desiring a particular job position from 60 to 80 will increase his chances of meeting his needs based on the available jobs pertaining to his requirements.

Further, feedback generator 212 may provide the listing of all parameters that may be responsible for affecting the one or more scores of the data objects. The parameters may contribute to the score calculation by either enhancing or hampering the user's chances of fulfilling his requirement. Further, the user may be given the option to modify and/or remove one or more of the listed parameters and weighting associated with the same. Additionally, one or more new parameters and related weighting may also be added by the user manually.

Additionally, in an embodiment, feedback generator 212 may also suggest the best match to the user's requirement, by judging the minimum modifications that need to be made in order to achieve the best match judged by a high absolute score, made to compare one or more distinctly comparable data objects that lie in the same domain. For example, the user may be informed that with his cost considerations, he will be able to go for a ten day vacation as per his requirement to San Jose instead of Los Angeles.

Further, the feedback generated by feedback generator 212 may provide a listing and/or grouping of the various available options with respect to the services and/or products desired by the user, such that the listing provided is in descending order of degree by which the available options may fit the requirements of the user.

Further, as per an embodiment, the user may be informed that on making the suitable improvements in the submitted data object, the user would be able to satisfy his requirements service within a specified duration. For example, the user may be informed that on acquiring a particular skill set, it is estimated that he will be hired to his desired job position within a period of two months.

Further, as per an embodiment, the feedback provides an option to the user to incorporate the one or more changes, which may include suggestions to include certain internal parameters, remove certain internal parameters and/or modify certain internal parameters of the data object submitted by the user in order to improve the one or more computed scores. In one embodiment, feedback generator 212 may itself compute all the probable scores by automatically changing the various parameters.

In another embodiment, feedback generator 212 may receive the modified data objects from the user and re-compute the score associated with the data objects based on one or more changes in the internal parameters, or change of value assigned to the parameters. The change of the parameter may be due to user amendment, change in the external parameters, change of weighting given to the parameters considered as function points, etc.

FIG. 3A illustrates an exemplary data object 300 submitted by the user. In an example embodiment of the present invention, data object 300 is a digital file that contains the user's requirements. In the example embodiment, the user is an individual, who has submitted data object 300 for a suitable job position. Data object 300 states the one or more requirements of the user. Moreover, the one or more restrictions provided by the user include certain preferred companies, expected position, salary considerations, location considerations and mode (full time or part time). These restrictions may act as conditions imposed by the user in order to meet his requirements. Data object 300 also contains the user's personal details, contact details, educational qualifications, skill set, additional professional courses, work experience and current job status. This information contained in data object 300 distinguishes the user from other competing users. Thus, this information includes the attributes possessed by the user which may either have a positive or negative impact on the requirement of the user. The combination of technological skills and his past experience in the same field prove to be one or more assets for an expected position the user wishes to acquire. Further, the reputation of the user's previous employer may also increase his chances of acquiring his requirements. Data object 300 also includes the past employer's recommendation and a disclosure by the user stating his self rating. The recommendation provided by the past employer may assist in providing a sense of the capabilities of the user.

In an embodiment of the present invention, extraction module 204 may employ an electronically executed method to scan and extract one or more parameters from data object 300 submitted by the user.

FIG. 3B illustrates a table 302 that includes the extracted parameters associated with data object 300. Extraction module 204 may extract the one or more internal parameters from data object 300 submitted by the user. In this example embodiment, the internal parameters may include user's requirement of acquiring a job, the one or more user's conditions/restrictions, user's salary requirements, job location, travel willingness, past experience, educational qualification, any gaps in career, current job status, expected position and self rating. These internal parameters are stored in internal parameter database 216 of knowledge base 214. These internal parameters may either have a positive or a negative impact on the job acquiring chances of the user. Further, these internal parameters are subject to modification by the user at a later stage, since the internal parameters are subject to the user's considerations. Further, domain analyzer 222 may analyze data object 300 and ascertain the domains to which data object 300 belongs to. In this example embodiment, data object 300 belongs to the job acquiring domain in the information technology sector. Based on this ascertained domain, extraction module 204 may search other data sources 104, which in this case may include company websites, and other online services related to market analysis, current economic condition and job acquiring trends pertaining to the individual's desired sector. Further, other statistical data related to the lay offs in the given sector, direction of movement of related organizations in recent times, competition in terms of demand-supply ratio, mass hiring done by companies in the related sector may also be extracted from the relevant other data sources 104. Further, the impact of the season of applying may also be considered. Also, the rarity of the skill set possessed by the user in terms of the current jobs in demand also serves as a suitable parameter which may assist in job acquisition. Accordingly, extraction module 204 may extract one or more relevant external parameters from these identified other data sources 104 and store these parameters in external parameters database 218. Further, the historical information related to the trend in the user's field of expertise is also extracted and stored in external factor database 218. Moreover, the recommendations provided by the user's past employers are also extracted and stored in external factor database 218.

FIG. 3C illustrates a table 304, which depicts the score computation of data object 300 submitted by the user. Rule generator 206 may retrieve the internal parameters, external parameters, the historical parameters and the recommendations stored in knowledge base 214. Further, in an embodiment of the present invention, comparison module 208 may compare data object 300 of the user with that of the competing users' based on the one or more extracted parameters. Comparison module 208 may use an electronically executed method to generate dependencies that map the one or more extracted parameters with each other, and thus forms one or more relationships amongst the extracted parameters. Further, computing module 210 may compute a relative score associated with data object 300 of the user. The relative score may be based on one or more extracted parameters associated with data object 300 and the comparison data received from comparison module 208. The relative score may be computed based on function points, which are defined based on the one or more extracted parameters and data objects of the competing users. These function points may contribute to the relative score calculation as per the weighting assigned to them. In the example embodiment, the internal parameters are given a weighting of 60%, external parameters are given a weighting of 25%, historical parameters are given a weighting of 5% and recommendations are given a weighting of 10%. The weighting of the function points assigned to the one or more internal parameters are: skill set—15 points, past experience—6 points, expected position—11 points, expected salary—10 points. Further, the weighting of the function points assigned to the one or more external parameters are: season of applying—12 points and rarity of skill set—6 points. Further, the weighting of the function points for historical parameters is 3 points and for the user's past employer's recommendations is 7 points. Thus, the relative score assigned to data object 300 of the user may have a score of 70, which is computed by the summation of the values assigned to these parameters. A person ordinarily skilled in the art may recognize that the numerical values provided in this example embodiment are merely for an example basis and do not limit the scope of the invention.

Further, rule generator 206 may generate one or more rules to link data object 300 of the user with that of the one or more organizations that may fulfill the user requirement of attaining a job position. Computing module 210 may compute an absolute score based on the degree to which the user's job requirement may match the needs of the organization offering that job. In an embodiment of the present invention, the computation of the absolute score also includes assigning function points with suitable weighting. In this case rule generator 206 generates rules that match the skill set required by the organization with the skill set of the user, the minimum qualifications required by the organization with that of the user, the competitor organizations and their hiring trends and the user's past experience. Based on the above factors, in this example embodiment, the user's data object 300 may be assigned an absolute score of 82, which indicates the availability of the user's job requiring needs being met. Further, the gross score computed is based on the average of the relative and absolute score computed. In the example embodiment, the gross score may be calculated as a value 76.

FIG. 3D illustrates a table 306 that depicts the feedback given to the user to enhance the one or more computed scores associated with data object 300. Feedback generator 212 may utilize the one or more computed scores and the one or more rules stored in rule base database 220 to provide an option of changing one or more internal parameters and thus may allow the user to improve his relative score. For example, the feedback may include one or more suggestions such as, but not limited to, that the user may do additional professional courses in computer networking from the reputed institute ABC based on the fact that the competing user has done the same. Moreover, the feedback may also include suggestions such as, but not limited to, that if the user changes his residence to Los Angeles, his chances of acquiring his desired job will increase by 5%. Further, the feedback may also indicate that the user has a probability of achieving his desired job requirement in two months if the suitable amendments are made. The feedback may also indicate that the complexity of his past projects and recommendations provided by his previous employer may assist him to achieve his job requirement. In an embodiment of the present invention, if the user performs one or more changes in data object 300 as per the suggestions provided by feedback generator 212, then computing module 210 may re-compute the new relative and absolute score for the user.

Process

Figure 4:
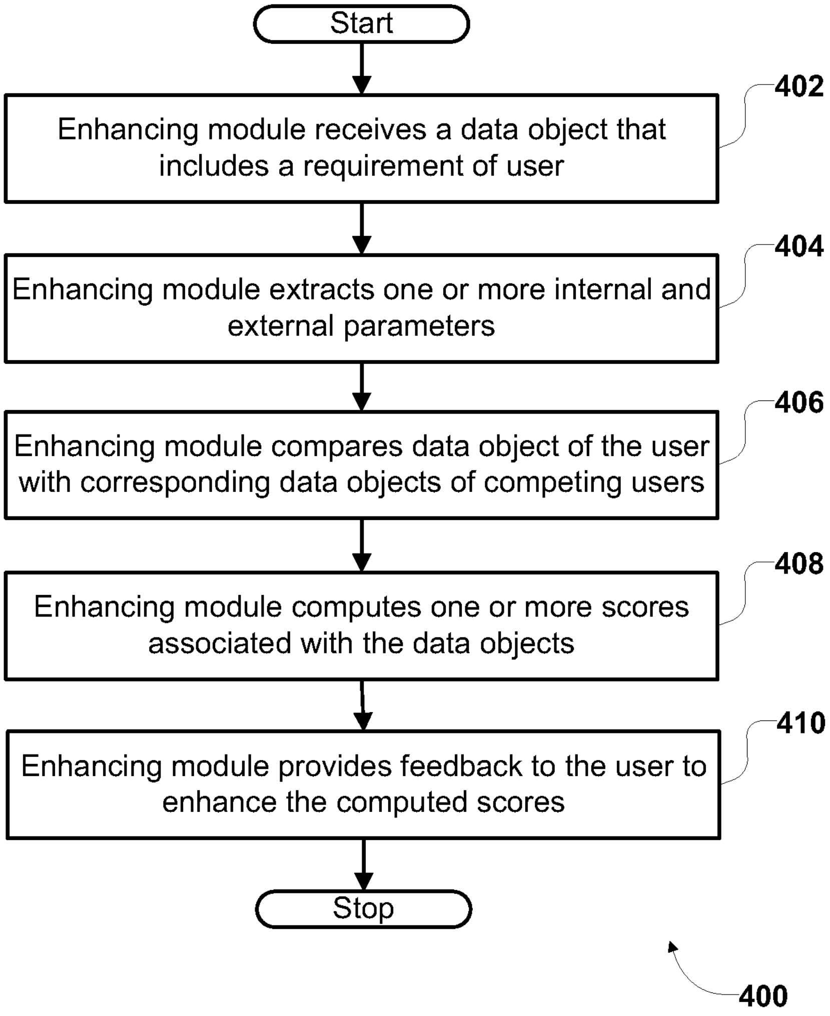
FIG. 4 is a flowchart illustrating an example method for enhancing one or more scores associated with data objects.

FIG. 4 is a flowchart illustrating an example process for enhancing one or more computed scores associated with the data object.

At step 402, receiving module 202 may receive the one or more data objects from application server 110. In an embodiment of the present invention, a user may have submitted the data objects with application server 110, by means of one or more web applications provided by application server 110. In one embodiment, the user may either be, but not limited to, an individual or an organization. Further, the data objects may include one or more requirements. For example, in case of the user being an individual, the requirements of the user may include, but not limited to, to acquire a suitable job position, to buy any consumer product, to buy/sell services and/or products in an online environment and the like. Additionally, in case of the user being an organization, the requirements of the user may include, but not limited to, to acquire a suitable employee as per the vacant job position, provide suitable holiday packages to tourists, sell available products or services to customers, and the like. Moreover, the data objects may also include one or more informational attributes associated with the user, such as, but not limited to, social contacts, qualifications, business motive, products information, contact details and the like. The data object may be, without limitation, a word processor document, a Portable Document Format (PDF) file, a text file, a Hyper-Text Markup Language (HTML) file, a Tagged Image File Format (TIFF) image or a Portable Network Graphics (PNG) image.

At step 404, extraction module 204 extracts the information included in the data objects. In one embodiment, extraction module 204 may employ manual methods and/or electronically executed methods such as, but not limited to, machine learning algorithms, neural networks, supervised learning, unsupervised learning, and the like; for converting the unstructured format of the data objects to a structured format and thus extract the information from the data objects. Machine learning is a scientific discipline concerned with the design and development of algorithms that allow computers to learn based on data, such as from sensor data or databases.

In an embodiment, extraction module 204 may extract one or more internal parameters based on the information included in the data objects. In one embodiment, extraction module 204 may employ electronically executed methods to extract the internal parameters. In another embodiment, the internal parameters can be extracted manually. The internal parameters are those parameters that are essential to the data object and are derived from the data objects submitted by the user. The internal parameters are stored in an internal parameter database 216 of knowledge base 214. Enhancing module 112 may also include a domain analyzer 222 that suitably identifies the domains and sub-domains that the data objects pertain to. Further, rule generator 206 may be used to convert the one or more extracted parameters into suitable rules such that the rules are stored in rule base database 220.

In one embodiment, extraction module 112 may also extract one or more external parameters based on the information contained in the data object. External parameters include all those parameters that may directly or indirectly have an impact on the data objects submitted by the user. External parameters may include, but not limited to, social parameters, political parameters, socio-political parameters, environmental parameters, locational parameters, economic parameters, statistical comparative parameters, skill parameters, and the like that are relevant to the domain that the data objects belongs to.

Further, the external parameters also include the statistical comparative analysis of the requirements of other data objects submitted by competing users that pertain to the same domain and/or sub domain of the user. This comparative analysis data may be gathered over time. This comparative analysis data extracted may be used, but not limited to, compare the user's data object with that of one or more competing user data objects.

Additionally, in an embodiment of the present invention, the historical information pertaining to the same domain as the data object may also be considered as a parameter for the calculation of the one or more scores associated with the data object. In an embodiment, inputs and/or recommendations provided by the user himself and/or other users may also be considered in the calculation of the one or more scores associated with the data object.

In one embodiment, rule generator 206 may convert the extracted internal and external parameters into one or more rules to make suitable inferences on the extracted information through these parameters.

Rule generator 206 is used to generate one or more rules that arise from the dependencies that exist in the parameters that affect the data objects. These one or more dependencies may exist between one or more internal parameters, external parameters, and further optionally between historical parameters and/or recommendations, or any combination thereof. The parameters affecting the data objects are suitably retrieved from the internal parameter database 216 and external parameter database 218 of the knowledge base. Additionally, the inter-relationship or dependencies may be formed relating to the parameters that pertain to a single data object or a collection of one or more data objects that belong to the same class identified by domain analyzer 222. In one embodiment, an electronically executed method and/or manual method may be used to derive these sets of rules, by taking into consideration the relationships that may arise, both directly and indirectly, from the parameters that may affect the data object or group of data objects that pertain to the same class or both. These rules may be generated by the mapping of the extracted parameters, which includes internal and external parameters, and inferred dependencies that are stored in rule base database 220 of knowledge base 214.

At step 406, comparison module 208 may compare the one or more data objects of the user with that of the competing users for the same requirements. In one embodiment, the data objects are compared based on the information extracted from one or more internal and external parameters. The comparison of these data objects may take place, but not limited to, by comparing the one or more data objects that belong to the same domain and/or sub domain identified by domain analyzer 222.

At step 408, computing module 210 may compute the one or more scores based at least on one of the comparison data received from comparison module 208 and/or from the information extracted from the one or more internal parameters, external parameters, optionally including historical parameters and/or recommendations. Computing module 210 may retrieve the rules generated and stored in rule base database 220 to compute, but not limited to, an absolute score and a relative score. These rules may either be generated by rule generator 206 or stored manually by system administrator. Further, the extracted parameters may be retrieved from the internal parameter database 216, external parameter database 218 or any combination thereof.

In one embodiment, the relative score associated with the data objects is calculated based on, but not limited to, the internal parameters, external parameters, and the comparison data received from comparison module 208. Thus, the relative score of data objects may provide the standing of the data objects submitted by the user to that of other data objects submitted by competing users that belong to the same class as that of the user's data object.

In one embodiment, the absolute score may be the measure of the degree by which two comparable data objects, namely the user requirement with the available service and/or product corresponding to the user requirement, are similar. The absolute score is calculated based at least in part on a comparison between the requirements included in the data objects of the user and the complimental requirements included in the data objects of the complimentary users. Moreover, in one embodiment, absolute score may be calculated based on, but not limited to, the extracted parameters that may belong to a group of one or more data objects that may belong to the same class. Hence, the absolute score of the data object may provide the measure of how closely the user's requirements may be matched to the corresponding complementary requirements of another user (who provide the service and/or product to match the user requirement). In other words, the absolute score provides an indication of a likelihood of how the user fares against the complimentary requirements.

In one embodiment, computing module 210 may calculate a gross score which may be the summation of the average of the absolute score and the relative score.

At step 410, feedback generator 212 may analyze the one or more scores computed by computing module 210 and provides a listing of the internal parameters, external parameters, optionally including historical parameters, recommendations, or all, that need to be modified, improved, added or removed, in order to enhance the one or more scores associated with the data object.

In an embodiment of the present invention, if the user modifies the one or more data objects, based on the suggestions from feedback generator 212, then the computing module 210 may re-compute the one or more scores associated with the one or more data objects.

Enhancing Score System Architecture

Figure 5:
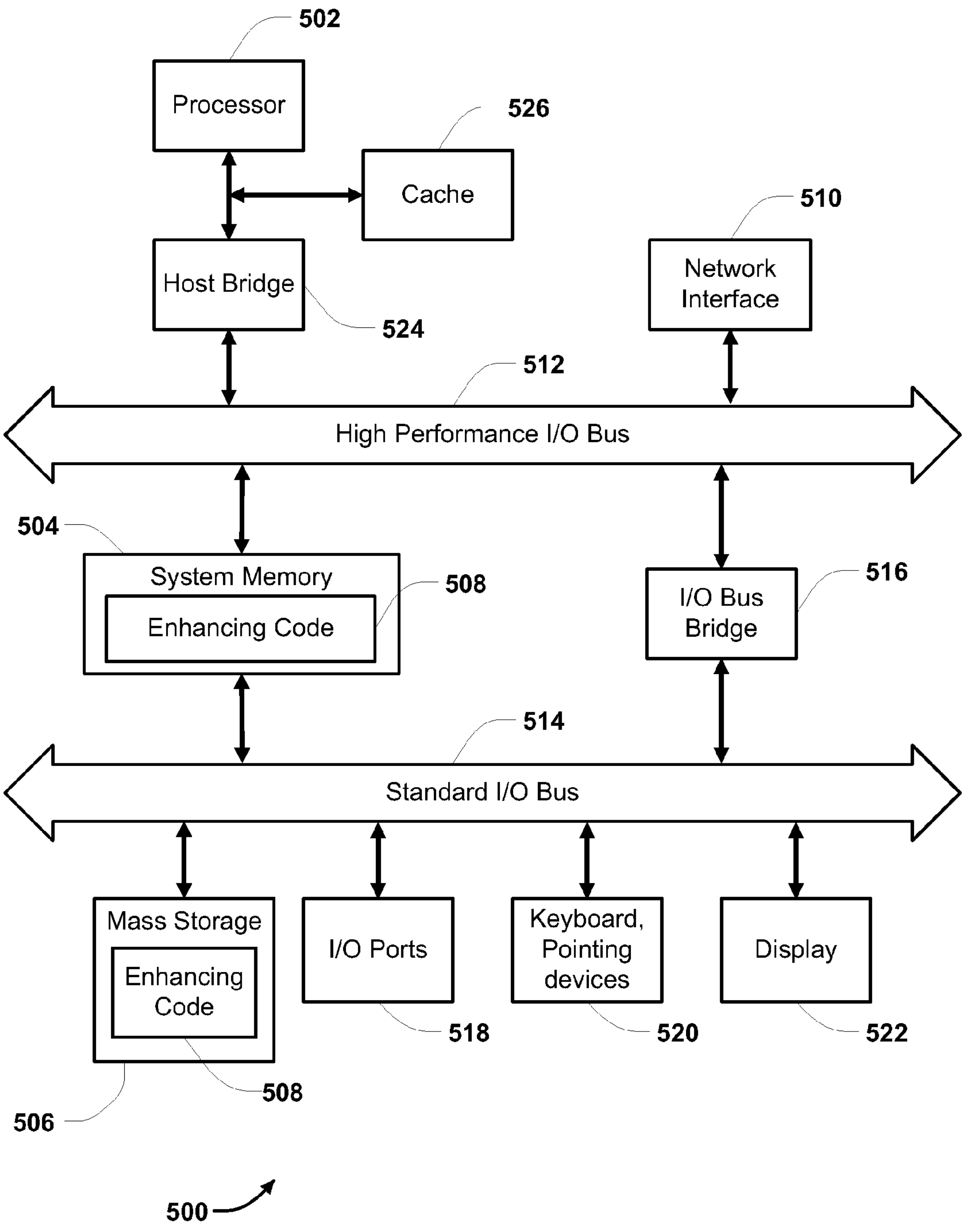
FIG. 5 is a schematic diagram illustrating an example computing system for enhancing one or more scores associated with the data objects according to one embodiment.

FIG. 5 illustrates an example hardware system 500 to implement score enhancing system 112 according to one embodiment. Hardware system 500 includes at least one processor 502, a system memory 504, and mass storage 506. The system memory 504 has stored therein one or more application software, enhancing code 508 for implementing score enhancing system 112, an operating system and drivers directed to the functions described herein. Mass storage 506 provides permanent storage for the data and enhancing code 508 for score enhancing system 112, whereas system memory 504 (e.g., DRAM) provides temporary storage for the data and programming instructions when executed by processor 502. The process flow of the enhancing code 508 for score enhancing system 112 is described in detail in conjunction with FIG. 4. In one embodiment, knowledge base 114 may reside in mass storage 506. A network/communication interface 510 provides communication between hardware system 500 and any of a wide range of networks, such as an Ethernet (e.g., IEEE 802.3) network, etc. Additionally, hardware system 500 includes a high performance input/output (I/O) bus 512 and a standard I/O bus 514. System memory 504 and network/communication interface 510 are coupled to bus 512. Mass storage 506 is coupled to bus 514. I/O Bus Bridge 516 couples the two buses 512 and 514 to each other.

In one embodiment, process 400 described herein is implemented as a series of software routines run by hardware system 500. These software routines comprise a plurality or series of instructions to be executed by a processor in a hardware system, such as processor 502. Initially, the series of instructions are stored on a storage device, such as mass storage 506. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 510. The instructions are copied from the storage device, such as mass storage 506, into system memory 504 and then accessed and executed by processor 502.

In one embodiment, hardware system 500 may also include I/O ports 518, a keyboard and pointing device 520, a display 522 coupled to bus 512. I/O ports 518 are one or more serial and/or parallel communication ports that provide communication between additional peripheral devices, which may be coupled to hardware system 500. A host bridge 524 couples processor 502 to high performance I/O interface 510. Hardware system 500 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 500 may include a variety of system architectures; and various components of hardware system 500 may be rearranged. For example, cache 526 may be on-chip with processor 502. Alternatively, cache 526 and processor 502 may be packed together as a "processor module," with processor 502 being referred to as the "processor core. "Furthermore, certain embodiments of the present invention may not require nor include all of the above components. For example, the peripheral devices shown coupled to standard I/O bus 512 may couple to high performance I/O interface 510. In addition, in some embodiments only a single bus may exist with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:

receiving, at a computing device over a network, a data object from a user, the data object including a requirement associated with the user;

extracting, via the computing device, one or more internal parameters from the data object, said extraction of the one or more internal parameters comprising converting the data object from an unstructured format to a structured format and extracting at least one updated attribute of the data object which is essential to the data object;

extracting, via the computing device, one or more external parameters from a remote domain that contains information related to the data object, said extraction is based at least in part on the conversion of the format of the data object, said external parameters comprising at last one social parameter that directly or indirectly and positively or negatively impacts the data object;

comparing, via the computing device, the data object of the user with a corresponding data object of a competing user based, at least in part, on the extracted internal and external parameters and the requirement included in the data object of the user;

computing, via the computing device, a score associated with the data object of the user based, at least in part, on the comparison of the data object of the user with the corresponding data object of the competing user and the extracted internal and external parameters, the score is indicative of a likelihood of achieving the requirement included in the data object; and communicating, over the network, feedback to the user directed to enhancing the computed score.

2. The method of claim 1, wherein the data object of the competing user includes a requirement, and/or information associated with the competing users.

3. The method of claim 1, wherein the score is computed based, at least in part, on a comparison of the data object and requirement of the user with a corresponding data object and requirement of a complementary user, wherein a complementary user provides services and/or products to satisfy the requirement included in the data object of the user.

4. The method of claim 1, wherein the internal parameters are extracted via a processor executing in association with the computing device.

5. The method of claim 1, wherein extracting the internal parameters further comprises updating the internal parameters after a pre-defined period of time.

6. The method of claim 1, wherein the external parameters are selected from a group consisting of political parameters, socio-political parameters, environmental parameters, locational parameters, economic parameters, statistical comparative parameters, and skill parameters.

7. The method of claim 1, wherein the one or more extracted parameters include historical parameters associated with the data object.

8. The method of claim 1, wherein the one or more extracted parameters include one or more recommendations associated with the data object.

9. The method of claim 1, wherein the score includes at least one of an absolute score or a relative score.

10. The method of claim 9, wherein the relative score is computed based on one or more of the internal parameters, external parameters and the comparison data.

11. The method of claim 9, wherein the absolute score is computed based on a comparison between the requirement of the user and the one or more services and/or products corresponding to the complimentary user.

12. The method of claim 11, wherein one or more available services and/or products include recruiting services, online buying or selling of products and/or services.

13. The method of claim 1 further comprises providing a gross score, wherein the gross score is the summation of a plurality of computed scores.

14. The method of claim 1, wherein the feedback is based, at least in part, on one or more of the extracted parameters.

15. The method of claim 1, wherein the feedback comprises providing an option to modify the data object to enhance the computed score.

16. The method of claim 1 further comprises receiving, from the user, a modified data object.

17. The method of claim 16 further comprises re-computing the score based on the modified data object.

18. A system comprising:

a processor;

a non-transitory computer-readable storage medium for tangibly storing thereon program logic for execution by the processor, the program logic comprising:

receiving logic executed by the processor for receiving a data object from a user, the data object including a requirement associated with the user;

extracting logic executed by the processor for extracting one or more internal parameters from the data object, said extraction of the one or more internal parameters comprising converting the data object from an unstructured format to a structured format and extracting at least one updated attribute of the data object which is essential to the data object;

extracting logic executed by the processor for extracting one or more external parameters from a remote domain that contains information related to the data object, said extraction is based at least in part on the conversion of the format of the data object, said external parameters comprising at least one social parameter that directly or indirectly and positively or negatively impacts the data object;

comparison logic executed by the processor for comparing the data object of the user with a corresponding data object of a competing user based, at least in part, on the extracted internal and external parameters and the requirement included in the data object of the user;

computation logic executed by the processor for computing a score associated with the data object of the user based, at least in part, on the comparison of the data object of the user with the corresponding data object of the competing user and the extracted internal and external parameters, the score is indicative of a likelihood of achieving the requirement included in the data object; and communication logic executed by the processor for communicating feedback over a network to the user directed to enhancing the computed score.

19. A non-transitory computer-readable storage medium tangibly encoded with computer program code which, when executed by a computing device, causes the computing device to perform a method comprising:

receiving a data object from a user, the data object including a requirement associated with the user;

extracting one or more internal parameters from the data object, said extraction of the one or more internal parameters comprising converting the data object from an unstructured format to a structured format and extracting at least one updated attribute of the data object which is essential to the data object;

extracting one or more external parameters from a remote domain that contains information related to the data object, said extraction is based at least in part on the conversion of the format of the data object, said external parameters comprising at least one social parameter that directly or indirectly and positively or negatively impacts the data object;

comparing the data object of the user with a corresponding data object of a competing user based, at least in part, on the extracted internal and external parameters and the requirement included in the data object of the user;

computing a score associated with the data object of the user based, at least in part, on the comparison of the data object of the user with the corresponding data object of the competing user and the extracted internal and external parameters, the score is indicative of a likelihood of achieving the requirement included in the data object; and communicating feedback over a network to the user directed to enhancing computed score.

* * * * *